United States Patent [19]

Baldauf

[11] 4,241,577
[45] Dec. 30, 1980

[54] AUXILIARY DRIVE SYSTEM WITH NEUTRAL

[75] Inventor: Dale Baldauf, Coldwater, Ohio

[73] Assignee: Paul Revere Corporation, Greenwich, Conn.

[21] Appl. No.: 68,756

[22] Filed: Aug. 23, 1979

[51] Int. Cl.³ .................. B60K 17/34; F15B 11/06; F15B 13/06
[52] U.S. Cl. ........................... 60/420; 60/483; 60/484; 180/242; 180/307; 180/308
[58] Field of Search ............... 180/233, 242, 243, 307, 180/308; 60/420, 445, 483, 484

[56] References Cited

U.S. PATENT DOCUMENTS

| | | | |
|---|---|---|---|
| 3,114,424 | 12/1963 | Voreaux et al. | 180/307 X |
| 3,736,732 | 6/1973 | Jennings et al. | 180/243 X |
| 3,997,017 | 12/1976 | Campbell et al. | 180/243 X |
| 4,072,009 | 2/1978 | Daschievici et al. | 180/648 X |
| 4,140,196 | 2/1979 | Brewer | 180/242 |

Primary Examiner—Irwin C. Cohen
Attorney, Agent, or Firm—Robert J. McNair; Abraham Ogman

[57] ABSTRACT

The steerable wheels of a hydraulically driven vehicle are provided with auxiliary motors which are connected in parallel both with each other and with the motor which powers the main drive wheels. A selector valve permits the motors for the steerable wheels to be optionally connected and disconnected from the reversible, variable displacement main pump. Flow dividers in the hydraulic lines limit the maximum flow of fluid to any one hydraulic motor. The auxiliary motors are of the variable displacement type, enabling them to be destroked to neutral when disconnected from the main pump. Destroking to neutral eliminates energy loss due to the pumping of large quantities of hydraulic fluid through a closed loop when the motors are driven by the wheels.

6 Claims, 1 Drawing Figure

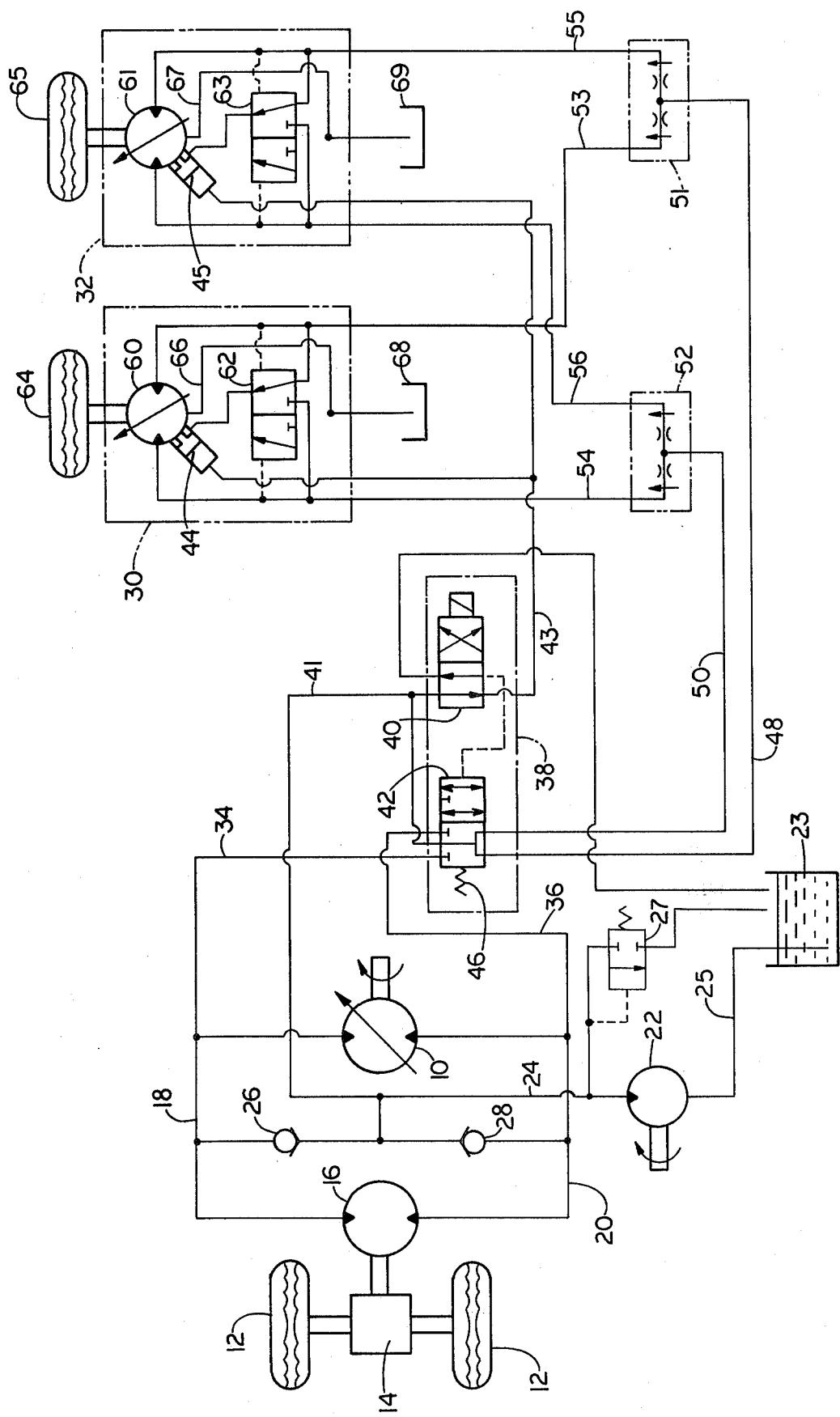

AUXILIARY DRIVE SYSTEM WITH NEUTRAL

BACKGROUND OF THE INVENTION

This invention relates generally to hydraulic drive systems and more specifically, to a hydraulically driven vehicle wherein motors on two of the wheels can be optionally powered as needed. Generally, an off-highway vehicle includes a load carrying body supported on both a pair of main traction wheels and a pair of steerable wheels. When operating under heavy load in soft soil conditions, it is desirable to have the steerable wheels powered as well as the main traction wheels. Once the loaded vehicle reaches a hard surfaced road, however, it is better to be able to deactivate the hydraulic drive from the steerable wheels and rely on the main drive wheels for propulsion. With my invention this is possible.

Various hydraulically driven vehicles are known. The U.S. Pat. to Jennings, et al No. (3,736,732) shows an auxiliary drive system for driving the steerable rear wheels of a combine. U.S. Pat. No. 3,997,017 discloses an auxiliary hydrostatic front wheel drive system having fluid pressure actuated clutches to effect a driving combination between the motors and wheels. U.S. Pat. No. 4,072,009 presents the pressure system for driving the wheels of a skid steered front loader. U.S. Pat. No. 4,140,196 shows an auxiliary drive system for optionally powering the steerable wheels of a four-wheel vehicle.

None of the above disclosed systems have the inherent advantages of my invention. A vehicle equipped with my invention does not require the operator to dismount and reposition a wheel-hub mechanism for either engagement or disengagement. More importantly, when the steerable wheels of my invention are operating in the unpowered mode they do not present a drag of several horsepower on the vehicle. This is because the auxiliary motors used in my system do not pump large quantities of fluid around a closed loop when the wheels turn the motors causing them to act as pumps.

SUMMARY OF THE INVENTION

It is an object of my invention to provide a highly efficient auxiliary drive system for a vehicle. Auxiliary power is supplied to the two steerable wheels of a vehicle by a pair of hydrostatic motors which are supplied fluid from the variable displacement pump which drives the main traction wheels. Destroking type hydrostatic assist motors are used.

When auxiliary power is not required, the supply of hydrostatic fluid can be disconnected by a selector valve. The selector valve performs two types of control functions. First, it controls the delivery of low pressure line charging fluid to the auxiliary motors. Second, the selector valve serves to connect or disconnect the auxiliary motors with the hydraulic line system connecting them with the variable displacement pump that supplies high pressure hydrostatic fluid. When the selector valve is moved to its "disconnect auxiliary drive" position, charging pressure flows through the selector valve and on reaching the auxiliary motors, causes them to be destroked to a neutral status. At the same time the supply of high pressure fluid from the variable displacement pump is cut-off from the auxiliary motors and the motor input line short circuited to the output line.

There are flow dividers in the high pressure lines which supply fluid to the auxiliary motors. The flow dividers allow the output of the variable displacement pump to drive all motors in parallel. No one motor can receive an excessive flow of fluid during a wheel spinout. The flow dividers have been selected to allow a 10 percent variation in fluid flow to each auxiliary motor. This amount of variation has been determined as necessary to accommodate the differential action associated with steering.

With my invention, auxiliary power is provided on an operator selectable basis at each steerable wheel. This greatly improves vehicle maneuverability in soft soil conditions. The assist circuit is fully protected from uncontrolled spin-out conditions which could damage the hydrostatic motors and detract from vehicle performance. Activating a single selector valve disconnects the assist circuit completely from the main traction system and destrokes the assist motors to zero displacement. This complete auxiliary drive circuit provides a functional power assist for any four wheel drive vehicle. The controls are simple and reliable. The auxiliary motors can be destroked to zero displacement so as to eliminate any induced flow, pressure drop or heat buildup in the auxiliary components when the vehicle is being towed or operated at a high velocity with the two wheel drive system. This eliminates hydraulic energy loss which significantly reduces operational heat buildup in the circuit and therefore extends the life of the components and greatly improves overall circuit efficiency.

BRIEF DESCRIPTION OF THE DRAWING

The sole FIGURE of the drawing is a diagrammatic illustration of the preferred embodiment of a hydrostatic system for driving the steerable wheels of a vehicle.

DESCRIPTION OF THE PREFERRED EMBODIMENT

The lone drawing FIGURE shows the general arrangement of both the main and auxiliarly drive system. Hydraulic energy from a variable displacement pump 10 powers the entire system. The main drive wheels 12 of the vehicle are driven through a conventional differential gear box 14. Gear box 14 may also contain variable ratio reduction gearing so that it can be properly driven by reversible hydraulic motor 16. Motor 16 is reversibly driven through hydraulic lines 18 and 20 by variable displacement pump 10. Pump 10 is conventionally driven by an internal combustion engine (not shown).

It will be understood that motor 16 has units coupled thereto which protect the system against excessive pressure. These units include: two high pressure relief valves, one at each side of the motor; a shuttle valve and a low pressure relief valve. Inclusion of these safety features protect against seal and line rupture.

The hydraulic lines of the main drive system are maintained in a charged condition by a low pressure, low volume charging pump 22 which draws fluid out of sump 23 via line 25. In most implementations, pump 22 is driven by the same prime mover which powers pump 10. Charging pump 22 connects to hydraulic lines 18 and 20 via line 24 and check valves 26 and 28. The pressure level established at the output of pump 22 is maintained by pressure relief valve 27. Excess oil is returned by valve 27 to sump 23, thereby keeping charging pressure in line 24 to a preset level. The charging circuit is thus able to make up for any leakage in the main or auxiliary drive system.

Connected in parallel with the main hydraulic motor 16 are a pair of auxiliary motors 30 and 32. The auxiliary motors are powered from variable displacement pump 10 by means of hydraulic lines 34 and 36. Control of the fluid in lines 34 and 36 is achieved by selector valve 38. In the drawing, selector valve 38 is shown in the disengaged position wherein only hydraulic motor 16 would be driven. Auxiliary motors 30 and 32 are unpowered since fluid in lines 34 and 36 cannot flow through spool 42 of selector valve 38. In the position shown in the drawing, charging pressure from pump 22 flows through charging line 41, through both spools 40 and 42, and from spool 40 thence via line 43 to the head ends of control pistons 44 and 45 of auxiliary motors 30 and 32. The charging pressure passing through spool 42 flows sequentially through line 48, first flow divider 51, and then in parallel through lines 53 and 55, first shuttle valve 62, second shuttle valve 63 and thence to the rod ends of control pistons 44 and 45. Charge pressure is thus exposed to both ends of the control pistons 44 and 45. Equal pressure acting on the differential areas of the control pistons permits springs (not shown) to destroke the auxiliary motors.

Actuation of spool 40 in selector valve 38 (This was a solenoid switch in the unit reduced to practice) causes charging pressure to be applied to the end of spool 42 and at the same time releases charging pressure from the head ends of control pistons 44 and 45. Pistons 44 and 45 have their rod ends attached to the stroking mechanisms of motors 60 and 61 respectively. Application of pressure to the end of spool 42 depresses spring 46 and with the endwise movement of the spool mechanism connects line 34 with line 48 and line 36 with line 50.

Forward pressure in line 48 causes fluid to flow through first flow divider 51. Flow divider 51 is of conventional design in that it contains a pair of fixed orifices which serve to equalize fluid flow along output lines 53 and 55. Similarly, reverse pressure in line 50 draws fluid back from auxiliary motors 30 and 32 via lines 54 and 56, through second fluid divider 52, along lines 50 and 36, and into pump 10.

Auxiliary motors 30 and 32 are of the destroking type. As shown in the drawing auxiliary motor 30 includes a first destroking motor 60, a first shuttle valve 62 and a first control piston 44. Similarly, auxiliary motor 32 includes second destroking motor 61, second shuttle valve 63 and second control piston 45. Destroking motor 60 drives wheel assembly 64 through a planetary gear reduction hub (not shown). In a similar manner, destroking motor 61 drives wheel assembly 65 through a second planetary gear reduction hub incorporated therein.

Forward hydrostatic pressure in line 48 passes through flow divider 51 and into lines 53 and 55. Forward pressure in lines 53 and 55 actuates shuttle valves 62 and 63 to the positions shown in the drawing. This positioning of the shuttle valves results in directing work pressure fluid to the rod ends of control pistons 44 and 45. Pressure on the rod ends of control pistons 44 and 45 places the destroking motors 60 and 61 in their maximum displacement positions. As a result, forward pressure hydrostatic fluid flowing along lines 53 and 55 starts motors 60 and 61 turning in a forward direction. Oil returns from destroking motors 60 and 61 along lines 54 and 56, through flow divider valve 52, line 50, the return orifice through spool 42 of selector valve 38 and then along line 36 to the input port of variable displacement pump 10.

When the flow of fluid through pump 10 is reversed, the direction of travel of all motors change. The main drive motor 16 reverses direction causing the vehicle to begin to move backward. With selector valve 38 in its actuated position, spring 46 will be depressed, allowing high pressure fluid to flow along line 50, through second fluid divider 52 and into line 54 and 56. Pressure in lines 54 and 56 causes shuttle valves 62 and 63 to switch positions, meaning that they assume the opposite state to that shown in the drawing. With the switching in position of shuttle valves 62 and 63, the pressure in lines 54 and 56 actuates control pistons 44 and 45 to maintain motors 60 and 61 in their maximum displacement positions. Flow of reverse pressure fluid from line 54 through motor 60 and out line 53 causes wheel assembly 64 to turn in a reverse direction. Similarly, flow of reverse pressure fluid from line 56, through motor 61 and out line 55 causes wheel assembly 65 to turn in a reverse direction. Second fluid divider 52 prevents either motor 60 or 61 from receiving an excess amount of fluid if either wheel 64 or 65 starts slipping.

Lines 66 and 67 connect motors 60 and 61 with sumps 68 and 69, respectively. This provides a return path for motor leakage. In actual practice sumps 68 and 69 will be in communication with sump 23 to assure that all working fluid remains in the system.

To deactivate the auxiliary system, spool 40 of selector valve 38 is returned to the position shown in the drawing. In the unit reduced to practice, spool 40 was part of a solenoid type switch and therefore, de-energizing of the solenoid accomplished the task. Spool 40 could also be a manually controlled unit. Once spool 40 returns to the position shown in the drawing, fluid pressure on the end of spool 42 drops and spring 46 returns spool 42 to the position shown. This interrupts the supply of high pressure fluid coming from pump 10. Further, the orifices within spool 42 are configured such that lines 48 and 50 are both connected to the charging pressure of line 41. This assures that no air pockets appear in the lines during the deactivated period.

Return of spool 40 to the position shown in the drawing connects the charging pressure in line 41 with line 43. Charging pressure in line 43 actuates control pistons 44 and 45, thus destroking motors 60 and 61 to their minimum displacement position. With both hydraulic motors 60 and 61 in their minimum displacement conditions, the vehicle can be operated at high speed in two wheel drive without having the assist motors pumping large volumes of oil around a closed loop thereby causing a drag of many horsepower on the system. Tests on prior art systems showed closed loop power losses of at least 15 Hp. With a system incorporating my invention, closed loop pumping losses are non-existent because motor displacement is zero.

In addition to supplying make-up oil to the auxiliary motor assembly, the continued application of charge pressure to the rotating components of motors 60 and 61 serves to hold these components against their respective motor swash plates, thereby preventing motor damage during the period that wheels 64 and 65 turn the motors.

While only a single embodiment of the invention has been presented, various modifications will be apparent to those skilled in the art. Therefore, the invention should not be limited to the specific illustration disclosed, but only by the following claims.

I claim:

1. An auxiliary drive system for a vehicle having a variable displacement main pump, a sump for providing a reservoir of hydrostatic fluid, a charging pump for drawing fluids from the sump via a hydrostatic line and delivering said fluids via interconnecting fluid lines to maintain all system components in a fully charged condition, the auxiliary drive system comprising:

a pair of variable displacement type reversible hydraulic auxiliary motors, each of said motors being operably and individually connected to a wheel assembly;

a pair of control pistons for varying the displacement status of said auxiliary motors, each one of said pistons having its rod end mounted for receiving fluid pressure to vary the displacement of each of said auxiliary motors;

first fluid line means connecting the two sides of each of the auxiliary motors with the variable displacement main pump, said fluid lines being arranged so that the auxiliary motors are connected in parallel with each other;

selector valve means having alternate on and off positions for controlling the flow of hydrostatic fluid in said first fluid lines, thereby allowing the auxiliary drive system to be activated or deactivated at will;

a pair of shuttle valves, one in close proximity to each of said variable displacement type reversible motors, each of said shuttle valves being encirculated to maintain said motor in its maximum displacement condition during both forward and reverse actuated states;

pressure compensated flow dividers interposed in said first fluid line means for limiting the maximum flow of hydrostatic fluid to any one auxiliary motor;

second fluid line means having one end in communication with the output of said charging pump, the second end of said second fluid line being connected to supply charging pressure to said auxiliary motors; and said selector valve means including valve means for controlling fluid flow to said control pistons enabling said pistons to be actuated to either of two states, one state being such that the auxiliary motors are maintained in their maximum displacement condition when said motors are being driven by output of said variable displacement pump, the second state being such that the auxiliary motors are maintained in their minimum displacement condition when said auxiliary motors are in the deactivated condition.

2. The invention as defined in claim 1 wherein the selector valve means includes in its "on" position circuitry connecting said first fluid line means with both sides of said variable displacement pump thereby placing opposite sides of each of said auxiliary motors in communication with said variable displacement pump, said selector valve means in its "on" position simultaneously allowing charging pressure to drain from said control pistons into said sump through said second fluid lines.

3. The invention as defined in claim 1 wherein the selector valve means includes in its "off" position circuitry which terminates all variable displacement pump fluid flow to said auxiliary motors, said selector valve means simultaneously allowing charging pressure fluid to maintain the auxiliary motors in their minimum displacement condition.

4. The invention as defined in claim 1 wherein the wheels connected to each of said auxiliary motors are steerable.

5. The invention as defined in claim 1 wherein two pressure compensated fluid flow dividers are utilized.

6. The invention as defined in claim 1 including use of a solenoid actuated type switch in said selector valve means.

* * * * *

UNITED STATES PATENT AND TRADEMARK OFFICE
CERTIFICATE OF CORRECTION

PATENT NO. : 4,241,577

DATED : December 30, 1980

INVENTOR(S) : Dale Baldauf

It is certified that error appears in the above-identified patent and that said Letters Patent are hereby corrected as shown below:

Column 4, line 47, please change "hydraulic" to
---hydrostatic---.

Column 5, Claim 1, line 29, please change "encirculated" to
---encircuited---.

Signed and Sealed this

Tenth Day of March 1981

[SEAL]

Attest:

RENE D. TEGTMEYER

Attesting Officer

Acting Commissioner of Patents and Trademarks